United States Patent
Takahashi

[11] 4,335,431
[45] Jun. 15, 1982

[54] SKID CONTROL METHOD

[75] Inventor: Junichi Takahashi, Katsuta, Japan

[73] Assignee: Hitachi, Ltd., Tokyo, Japan

[21] Appl. No.: 128,863

[22] Filed: Mar. 10, 1980

[30] Foreign Application Priority Data

Mar. 14, 1979 [JP] Japan ................................. 54-30447

[51] Int. Cl.³ .............................................. B60T 8/02
[52] U.S. Cl. ............................. 364/426; 235/92 FQ; 303/95; 303/109
[58] Field of Search ................. 364/424, 426; 303/95, 303/97, 104, 106, 109, 110; 235/92 MT, 92 FQ

[56] References Cited

U.S. PATENT DOCUMENTS

| | | | |
|---|---|---|---|
| 3,663,069 | 5/1972 | Perry et al. | 303/104 |
| 3,840,277 | 10/1974 | Bouthors | 364/426 |
| 3,998,496 | 12/1976 | Bernabo et al. | 303/106 |
| 4,050,747 | 9/1977 | Ruhnau et al. | 303/95 |
| 4,056,287 | 11/1977 | Gudat | 303/95 |

Primary Examiner—Errol A. Krass
Attorney, Agent, or Firm—Craig & Antonelli

[57] ABSTRACT

Various arithmetic processings for skid control are performed by using the memory in which the data representing the relationship between the brake releasing period and the slip rate to be controlled and by using a microcomputer having at least one free-running counter. In the arithmetic processing of the wheel speed, the contents of the free-running counter are successively stored in the memory in response to interrupt processing signals synchronized with the wheel speed pulses and the wheel speed is calculated from the difference between the contents of the counters written in the memory. Similarly, the measurement of the brake releasing period is also performed by calculating the difference between the written count values. The suitable slip rate is taken out of the memory on the basis of the measured brake releasing period.

11 Claims, 14 Drawing Figures

SKID CONTROL METHOD

This invention relates to a skid control method for controlling the pressure of braking oil when a vehicle slips during the application of brake operation and more particularly to such a method using a microcomputer.

In the skid control, the slip rate is calculated from the calculated wheel speed and when the calculated slip rate reaches a predetermined value, the brakes are released while when the slip rate is restored to another preset value, the braking oil pressure is applied. The time for which the brakes are released is measured and the next instant of brake releasing is controlled on the basis of the result of the measurement. Repeating this series of operations thereafter, the frictional coefficient between the wheels and the road surface is kept at a maximum value so that the stopping distance is shortened.

The calculation of the wheel speed is one of the most important factors necessary for the skid control as a whole and therefore must be processed exactly and swiftly. According to one of the conventional methods of calculating the wheel speed, wheel speed pulses are counted for a predetermined period and the wheel speed is calculated on the basis of the counted value. Another conventional method is to count clock pulses during the period of one or several wheel speed pulses thereby to obtain the wheel speed. However, these methods need a time longer than 10 ms for counting wheel speed pulses and no other processing can be performed during the time. Accordingly, there is caused a delay in control and the changes in the driving conditions cannot be followed up, so that the control lacks stability and the stopping distance becomes long.

These drawbacks of the conventional methods can be eliminated, though not completely, by providing a separate circuit for calculating the wheel speed and by processing the calculation of the wheel speed simultaneously with other arithmetic processing. However, in this case too, the time required for calculating the wheel speed itself is rather long so that the change in the wheel speed at small intervals cannot be detected. This makes accurate and fine control impossible. Moreover, the circuit for practicing each of the conventional methods consists of discrete components and therefore the whole constitution is complicated, the apparatus completed is expensive and the control characteristics of the manufactured apparatuses are not uniform.

Further, in the determination of a brake releasing timing and a brake releasing period, it is necessary to measure the brake releasing period of the immediately previous cycle, to calculate the slip rate having a predetermined relationship to the period and to control the brake releasing instant so that the actual slip rate equals the calculated slip rate. If an apparatus for performing this control is made up of discrete circuit components, its constitution is very complicated. Therefore, a method has been usually employed which, instead of obtaining the slip rate exactly, calculates an approximate value of the slip rate by modifying the measured value for the brake releasing period. However, this method cannot provide an accurate control responsive promptly to the change in driving conditions and therefore cannot be free from the drawbacks such that the resultant control lacks stability and that the stopping distance is long.

It is therefore the object of this invention to provide a skid control method according to which the speed of processing the calculations of the wheel speed and the slip rate is so high that a skid control with high precision can be effected.

According to the feature of this invention, various processings necessary for skid control are performed by using a memory storing the data representing the relationship between the brake releasing period and the slip rate to be controlled and also by using a microcomputer provided with at least one free-running counter. In the calculation of the wheel speed, the count values of the free-running counter are successively stored in the memory in response to the interrupt signals synchronized with the wheel speed pulses and the wheel speed is derived from the difference between the two count values written successively in the memory. Similarly, the brake releasing period is measured by calculating the difference between the count values of the free-running counter. The slip rate to be controlled is read out of the memory on the basis of the measured brake releasing period.

Other objects, features and advantages of this invention will be apparent when one reads the following description of the embodiment of this invention with the aid of the attached drawings, in which:

FIGS. 9(a) and (b) illustrate how to obtain the period of the wheel speed pulses;

FIGS. 11(a) and (b) illustrate how to obtain the on-time of the actuator.

Figure 1:
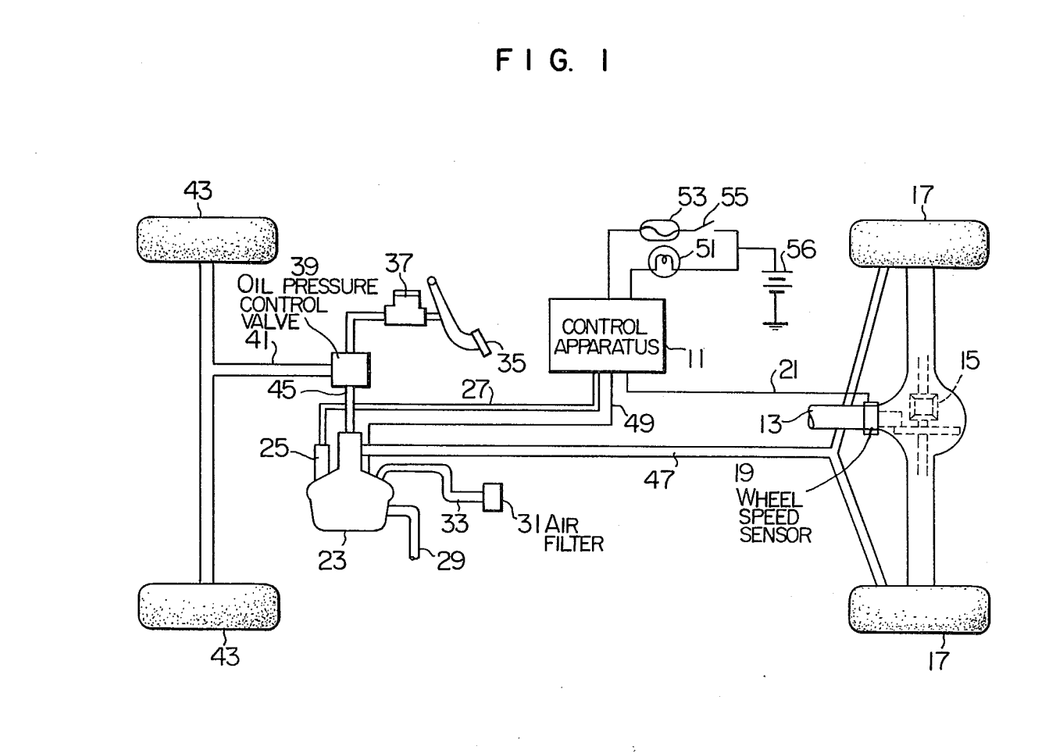
FIG. 1 schematically shows a skid control system using a microcomputer, as an embodiment of this invention.

FIG. 1 schematically shows a skid control system using a microcomputer (hereafter referred to as CPU), as an embodiment of this invention. The mechanical power generated by an engine (not shown) is transmitted through a transmission gear assembly (not shown) and a propeller shaft 13 to a differential gear 15, which in turn drives rear wheels 17. The output signals of a wheel speed sensor 19 attached to the propeller shaft 13 are sent through a signal line 21 to a control apparatus 11. The control apparatus 11 incorporates therein a CPU and an I/O circuit (i.e. input/output circuit). The detailed description thereof will be given later. An actuator 23 has a solenoid 25 energized by an output signal sent from the control apparatus 11 through a signal line 27. The diaphragm chamber in the actuator 23 communicates with the engine manifold having a negative pressure through a pipe 29 and with the surrounding atmosphere through an air filter 31 and pipe 33. The diaphragm of the diaphragm chamber is coupled to a piston rod. The force generated by depressing a brake pedal 35 is converted to an oil pressure by means of a master cylinder 37. The induced oil pressure is transmitted to an oil pressure control valve 39. The oil pressure discharged from the oil pressure control valve 39 is used, through a pipe 41, to brake front wheels 43 and also transmitted to the actuator through a pipe 45. The pressured oil whose pressure was controlled by the piston rod in the actuator 23, is used, through a pipe 47, to brake the rear wheels 17. The control apparatus 11 and the negative voltage terminal of the actuator 23 are connected together through a conductor line 49, to have the same potential. The control apparatus 11 also has a warning lamp 51 connected therewith for warning the malfunction of the system. A fuse 53 is inserted between the control apparatus 11 and a power source 56, the fuse 53 serving to cut the supply of power to the control apparatus to establish the normal braking condition when an abnormality occurs. When an ignition key switch 55 is turned on, electric power is supplied from the power source 56 to the control apparatus 11 through the fuse 53.

At the time of the brake being applied, if the solenoid 25 is turned on, the piston rod coupled to the diaphragm in the actuator 23 is shifted so that the oil pressure decreases to release the braking force.

Figure 2:
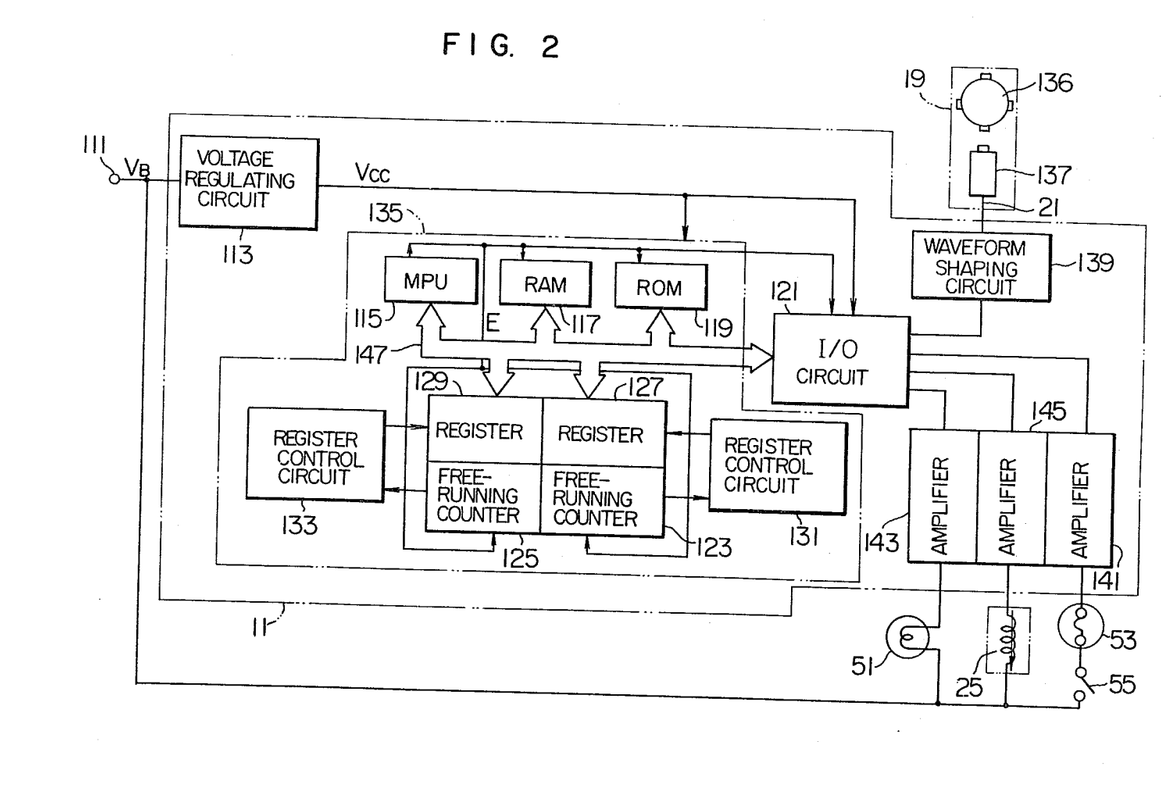
FIG. 2 shows in detail the principal part of the skid control system shown in FIG. 1.

FIG. 2 shows in detail the circuit of the control apparatus 11 shown in FIG. 1. The positive voltage terminal 111 of the control apparatus 11 is connected with the positive electrode of the power source and therefore a voltage $V_B$ is supplied to the control apparatus 11. The power source voltage $V_B$ is kept constant, for example, at +5 V, by means of a voltage regulating circuit 113. This constant voltage $V_{cc}$ of, for example, +5 V is applied to a CPU 135. The CPU 135 includes therein an MPU (Microprocesser) 115, an RAM (Random Access Memory) 117, an ROM (Read-Only Memory) 119, register control circuits 131 and 133, free-running counters 123 and 125, and registers 127 and 129. The constant voltage $V_{cc}$ is also supplied to an I/O (input/output) circuit 121. The microcomputer unit, MC6801, sold by Motorola Inc. is known as incorporating a free-running counter therein.

The wheel speed sensor 19 converts the rotational speed of a rotor 136 to the corresponding AC voltage by its electromagnetic pickup 137. The output of the pickup 137, i.e. the signal representing the rotational speed of the rotor 136, is supplied through a waveform shaping circuit 139 to the I/O circuit 121. The outputs of the I/O circuit 121 are supplied through amplifiers 141, 143 and 145 to the fuse 53, the warning lamp 51 and the solenoid 25.

The MPU 115, the RAM 117, the ROM 119, the registers 127 and 129, and the I/O circuit 121 are interconnected with one another through data bus, address bus and control bus 147 (all the buses are indicated by reference numeral 147). A clock signal E is sent from the MPU 115 to the RAM 117, the ROM 119, the free-running counter 123 and 125, and the I/O circuit 121, whereby the data transmission is performed in synchronism with this clock signal E. The free-running counters 123 and 125 count the pulses of the clock signal E. When the count value overflows the counters 123 and 125, they send an overflow signal to the register control circuits 131 and 133 respectively so that the counters 123 and 125 are set to their initial states and resume counting, repeating these cycles. The register control circuits 131 and 133 control the timing when to store the contents of the free-running counters 123 and 125 in the registers 127 and 129 respectively.

Now, the description will be given of the operation of the skid control system as an embodiment of this invention.

If a rolling body, e.g. a vehicle, moving at a speed of V in a certain direction on a plane, slips, then the associated slip rate S is defined such that $$S = (V - \omega R) \times (100/V)(\%) \qquad (1)$$

where R is the radius of the rolling body and $\omega$ is the angular velocity of the rolling body. Here, it is to be noted that the frictional coefficient $\mu$, defined between the tire of the vehicle and the road surface bearing the tire thereon, is a function of the slip rate S. According to experiments, it is seen that the frictional coefficient $\mu$ takes a maximum value in the direction of forward movement when the slip rate is near 20%, while $\mu$ decreases with the increase in S in the case of lateral slipping. Accordingly, if the slip rate S is controlled to be near 20%, the frictional coefficient $\mu$ between the tire and the road surface could be made maximum when the car skids. The skid control apparatus according to this invention controls the slip rate S in such a manner that S is near 20% in the case of skidding.

Figure 3:
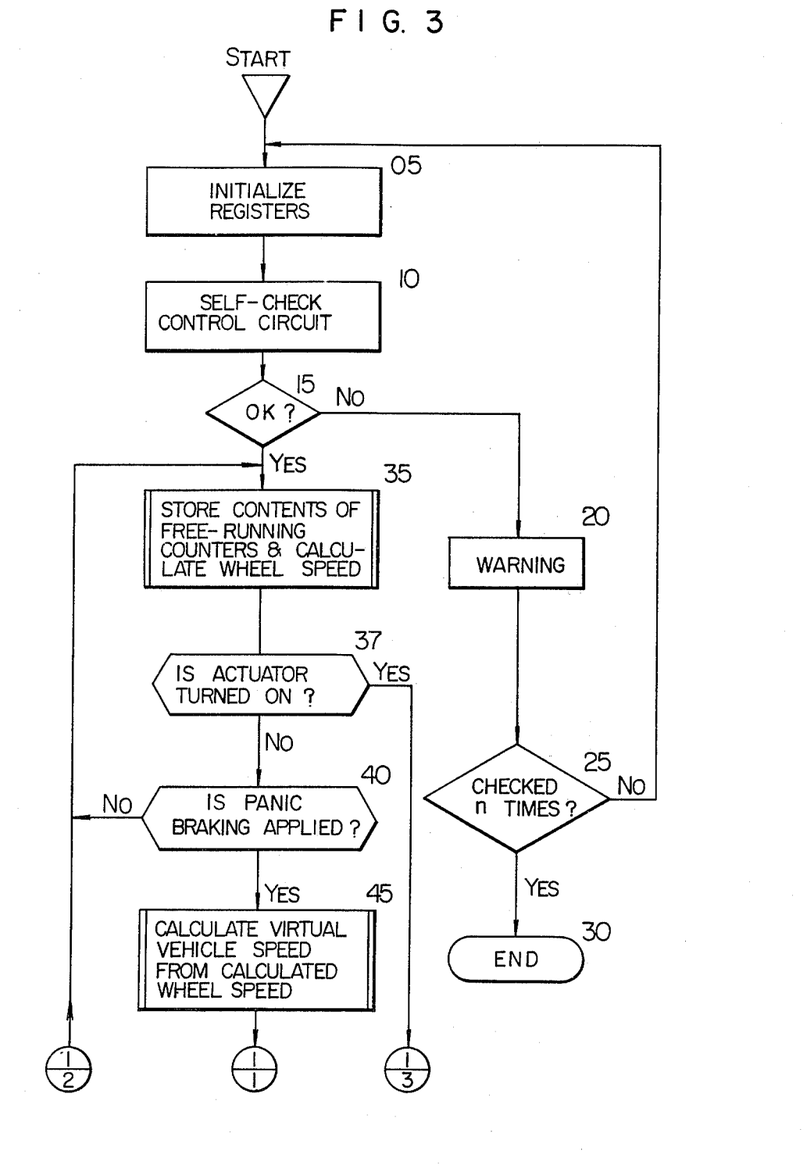
FIGS. 3 and 4 show a flow chart for explaining the operation of the skid control system shown in FIG. 1 or 2.
Figure 4:
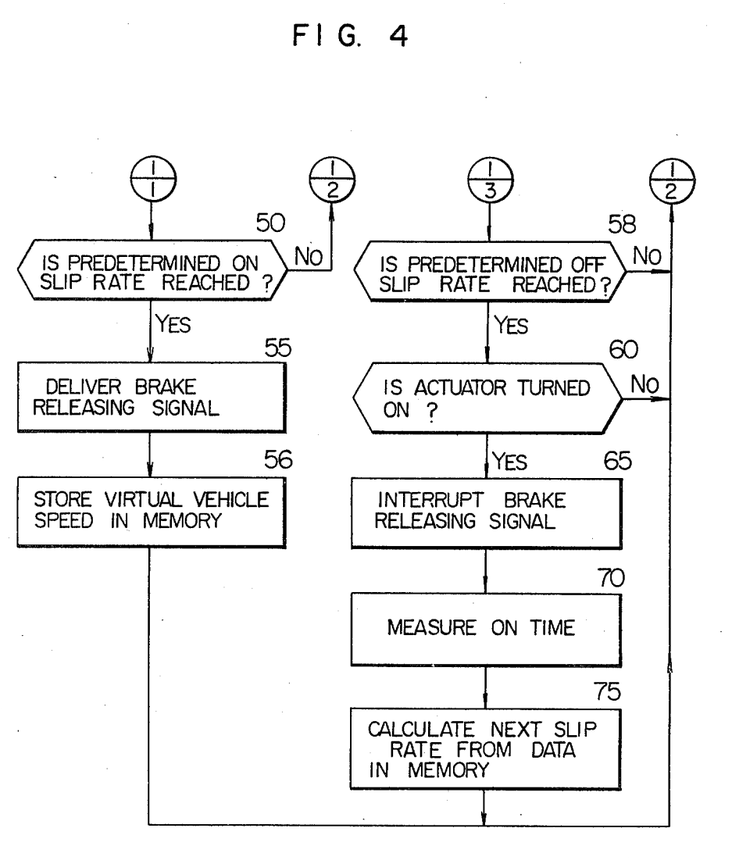

FIGS. 3 and 4 show a flow chart for explaining the operation of the control system according to this invention. As shown in FIG. 3, in step 05, the register group is initialized and simultaneously the polarity of a trigger signal for storing the contents of the free-running counters into the registers is specified. In step 10, the self-check of the control circuits, especially the functions of the memories and the I/O circuit, is performed. The MPU generates specific patterns and if the signal corresponding to the patterns is received, the check is judged to be OK in step 15. When the abnormal condition is found by the self-check, the abnormality is visualized by the warning lamp 15 (step 20) and simultaneously the self-checks are performed a predetermined number of times in step 25.

If the abnormal condition still remain after all the self-checks have been made, a warning lamp will be turned on and the operation is stopped in step 30. In this case, the normal braking operation is performed, but the skid control is not put into operation.

Figure 5:
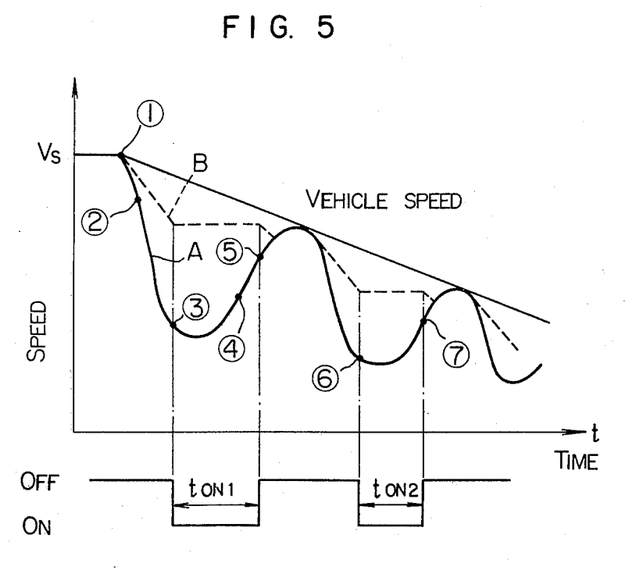
FIG. 5 shows in graphical representation the relationship among the vehicle speed, the virtual vehicle speed, the wheel speed and the operation of the actuator for controlling the brake oil pressure, at the time of panic braking.

When the self-check is O.K. in the step 15, control operation moves to step 35. In the step 35, the contents of the free-running counters are stored in the registers and the subtracting operation between the registers yields the wheel speed. In step 37, whether the solenoid of the actuator is energized or not is checked. Initially, the solenoid is deenergized or off. In step 40, whether a panic braking is applied or not, is checked on the basis of the variation of the wheel speed. Namely, if the decrease in the wheel speed exceeds a preset value, the panic braking is identified. This point is explained with the aid of FIG. 5. FIG. 5 shows the relationship among vehicle speed, virtual vehicle speed, wheel speed and the increase (ON) and decrease (OFF) in the brake oil pressure, in the case where the brake oil pressure is so controlled as to cause the frictional coefficient between the wheel and the road surface to be maximum when a panic braking is applied. Now, assume that a vehicle is moving at a speed $V_S$. If the vehicle is suddenly braked under this condition, the wheel speed is decreased along curve A as shown in FIG. 5.

Turning again to FIG. 3, if there is no panic braking, the step 35 is again reached to calculate the wheel speed. At the time of normal operation (driving without panic braking), a closed loop of the steps 35 to 40 is repeatedly executed. When a panic braking is detected in the step 40, step 45 is reached. In the step 45, the virtual vehicle speed is derived from the calculated wheel speed.

Here, the virtual vehicle speed should be exactly defined. In the expression for the skid rate S, V is defined as the speed of the rolling body (this corresponds to the vehicle speed). Therefore, the vehicle speed must be calculated to obtain the slip rate S. Since a vehicle is stopped by braking its four wheels, it is impossible to obtain the real vehicle speed directly. Accordingly, the virtual vehicle speed to give the measure of the actual vehicle speed must be obtained to be used and defined as one of the controlling items. In general the virtual vehicle speed is assumed to have a gradient of $-1.4$ - $-1.7$ g (gravity acceleration) and the slip rate S given by the above expression (1) is calculated under this assumption. In FIG. 5, broken curve B represents the virtual vehicle speed, which decreases at the above mentioned gradient at the deceleration starting point ①. On the basis of the comparison between the wheel speed calculated in the step 35 and the virtual vehicle speed calculated in the step 45, whether the predetermined ON slip rate is reached or not, is checked in step 50 in FIG. 4, the ON slip rate being the one for which the solenoid of the actuator is to be turned on. When the predetermined ON slip rate is detected in the step 50, that is, when the point ③ in FIG. 5 is reached, a brake releasing signal is generated in step 55. The ON slip rate at the point ③ is preferably equal to 0.5, as required by empirical factors. The brake releasing signal is stored in the memory in step 56 and it is held unaltered there until another signal is stored in the memory. After the brake releasing signal has been delivered, the control operation is returned to the step 35 in FIG. 3. Since the actuator is turned on in step 37, step 58 in FIG. 4 is then executed. In the step 58, whether the slip rate is equal to the predetermined OFF slip rate or not, is checked on the basis of the comparison between the wheel speed and the virtual vehicle speed, the predetermined OFF slip rate being the factor which leads the solenoid of the actuator to be deenergized or off. The predetermined OFF slip rate is always kept constant at, for example, 0.2 at the point ⑦ as well as the point ⑤ in FIG. 5. If the actual slip rate is below the predetermined OFF slip rate, that is, it corresponds to the point ④ in FIG. 5, then the control operation is returned to the step 35. When the predetermined OFF slip rate is reached, that is, any point after the point ⑤ in FIG. 5 is reached, step 60 is executed. In the step 60, unless the actuator is being energized, the step 35 is resumed while if the actuator is being energized the step 65 is executed. In the step 65, the brake releasing signal is interrupted and in step 65 the ON time (the period for which the brake releasing signal lasts) is measured. In step 75, the predetermined ON slip rate necessary for the next control, i.e. the slip rate corresponding to the point ⑥ in FIG. 5, is taken from the memory on the basis of the ON time measured in the step 70 and the value taken is then stored in the specified memory. The control operation is then transferred to step 35. The ON time for which the brake releasing signal lasts, varies depending on the magnitude of the frictional coefficient.

Moreover, the virtual vehicle speed is assumed to have a gradient of $-1$ g and the timing at which the second and succeeding brake releasing signals are delivered is changed, to correct the virtual vehicle speed, depending on the ON time $t_{ON}$ obtained in the immediately previous control cycle. Namely, the slip rate required in the second or succeeding control is a function of the ON time $t_{ON}$.

Figure 6:
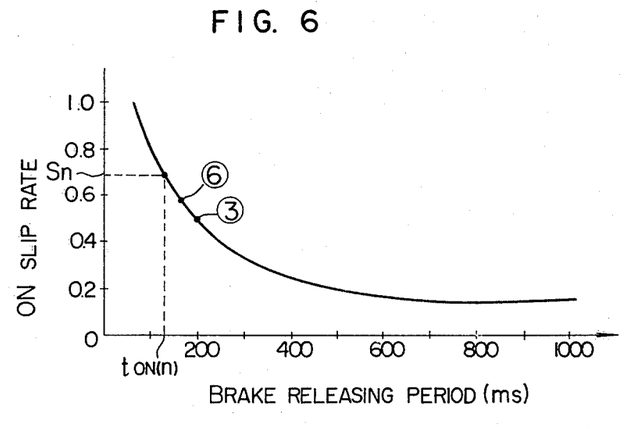
FIG. 6 shows the relationship between the brake releasing period and the slip rate S.

FIG. 6 shows the relationship between the ON time $t_{ON}$ and the predetermined ON slip rate S. It is assumed that the n-th brake releasing signal lasts for a period $t_{ON(n)}$ as shown in FIG. 6. Then, the predetermined ON slip rate S for determining the timing at which the (n+1)th brake releasing signal is delivered, is calculated to be $S_n$. Thereafter, similar operations are repeated until the wheels stop. Since it is difficult to express the relationship shown in FIG. 6 by an equation, it is stored in the memory with discrete sampling values at specific intervals, e.g. every 10 ms. It is therefore possible that if the ON time $t_{ON(n)}$ is measured, $S_n$ is immediately obtained. The points ③ and ⑥ in FIG. 6 correspond to the points ③ and ⑥ in FIG. 5.

Figure 7:
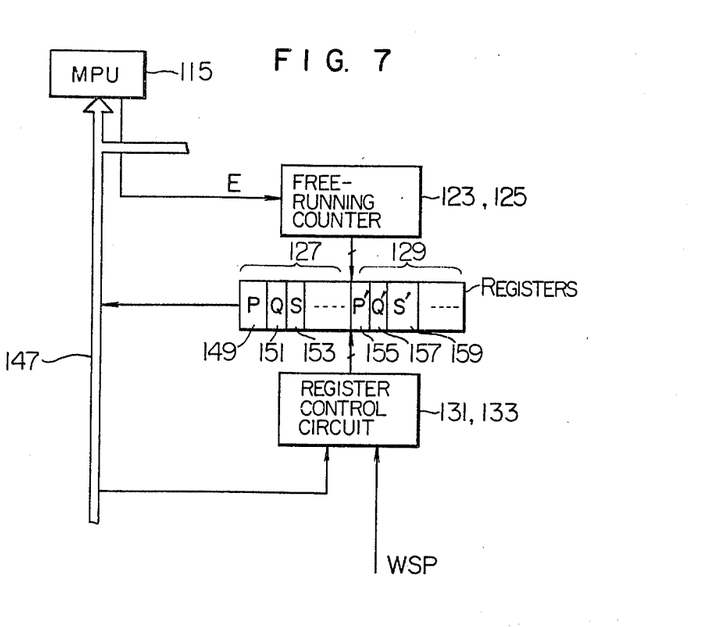
FIG. 7 is a block diagram useful in explaining the organic functions of the free-running counter, the register and the register control circuit.
Figure 8A:
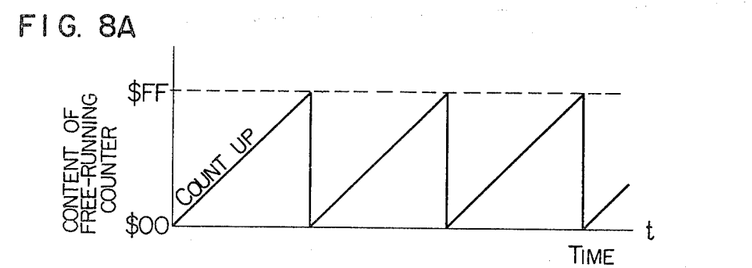
FIGS. 8A and 8B are diagrams useful in explaining the operation of the free-running counter.
Figure 8B:
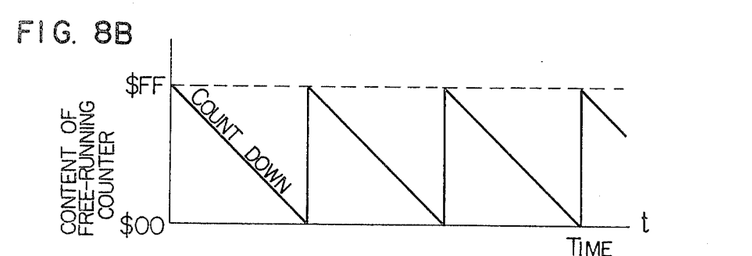

FIG. 7 is a diagram for explaining the operations of the free-running counters 123 and 125, the registers 127 and 129, and the register control circuits 131 and 133. A reference clock signal E generated by the MPU 115 is sent to the free-running counter 123 (hereafter only one of the equivalent members is mentioned for simplicity). The free-running counter 123 counts up or down in synchronism with the clock signal E, starting at the count value specified by the initialization cycle as shown in FIG. 8A or 8B, irrespective of the operation of the MPU 115. According to the mode shown in FIG. 8A, the counter 123 counts up, starting from the value $00 set through the initialization, and when the content of the counter 123 becomes equal to $FF, the count value is reduced to $00 in response to the next coming clock signal E. Thereafter, the above operation is repeated. On the other hand, according to the mode shown in FIG. 8B, the counter 123 counts down from the value $FF set through the initialization and when the count value reaches $00, it jumps up to $FF in response to the next clock signal E, being prepared again for counting down. Either of the modes can be selected depending on the method of control required.

The MPU 115 sends to the register control circuit 131 an instruction to cause the circuit 131 to send a trigger signal to the register 127 in response to the leading or trailing edge of the input signal, e.g. WSP (wheel speed pulse). In response to the trigger signal, the register 127 takes in and stores therein the content of the free-running counter 123, reached when the trigger signal is generated. The register 127 is, for example, of 16-bit structure.

Figure 9:
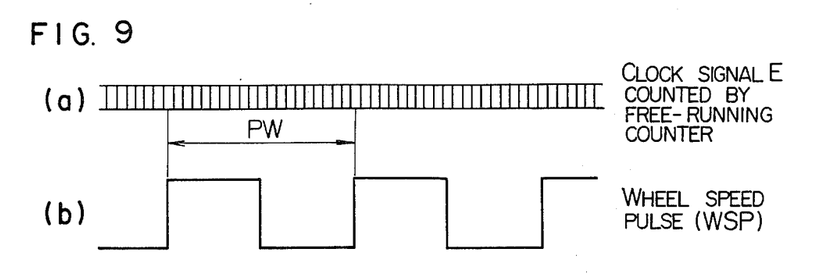

FIG. 9 illustrates the way of obtaining the period of the WSP (wheel speed pulse) signal. Software controls the delivery of the trigger signal in response to the leading edge or the trailing edge to take in the wheel speed. In FIG. 9, it is assumed that the trigger signal is delivered in response to the leading edge of the WSP according to the program. This instruction for triggering is effected through the software and the register control circuit 131 shown in FIG. 7 holds the old instruction unless this instruction is sent to the circuit 131 to rewrite its content. When a signal indicating the leading edge of the WSP is received, the count value at that instant of the free-running counter 123 is stored in the Q register 151 of the register 127 shown in FIG. 7. When a signal indicating the leading edge of the next WSP or the n-th (n<10) following WSP in the case of a high wheel speed is received, the count value of the free-running counter at that instant is stored in the P register 149 of the register 127 shown in FIG. 7. The operation of storing the contents of the free-running counter into the P and Q registers is performed by the event transition of the WSP, that is, the interrupt operation is performed in response to the WSP signal and the count values are stored through the interrupt processing. The time required for storing each content is 4–5 μs so that the storing operation by the P and Q registers is finished in about 9 μs. According to this method described above, the duration or width of a pulse of a pulse signal having a long repetition period can be measured for about 9 μs. Accordingly, the requirement according to the conventional measuring method that the MPU must be exclusively used for over the duration of a pulse in the measurement of the pulse width can now be eliminated. Therefore, each of the times required for various processings necessary for the skid control now in question can be shortened.

Figure 10:
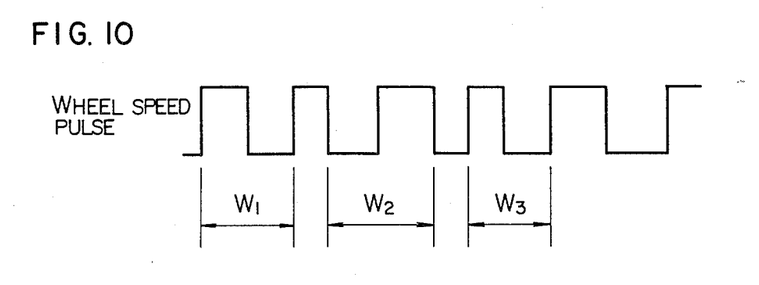
FIG. 10 illustrates how to obtain the pulse duration or width of the wheel speed pulses.

When the P and Q registers finish storing the contents of the free-running counter, the software generates an instruction to cause the P and Q registers to make a subtracting operation between them. And the result of the subtraction is stored in, for example, an S register 153 of the register 127. If the subtraction causes a carry signal, the subtraction is done in consideration of the carry signal. The wheel speed is obtained from the above result. In some cases, it may be difficult due to the mechanical structure of the wheel speed sensor to obtain uniform WSP's and therefore the I/O circuit may receive a signal having various duty cycles from the sensor. In such cases, if the wheel speed is determined by measuring the duration of a single pulse, a large error may be introduced depending on the instant of sampling, degrading the accuracy in measurement. To make the error in measurement minimum, the pulse widths W1, W2, W3, . . . etc. of several wheel speed pulses are measured as shown in FIG. 10 and the average W of them is calculated. By using the calculated average W as the wheel speed data for the succeeding calculation, the deviation of the output of the wheel speed sensor can be compensated to a great extent.

In the case of low wheel speed, the state of the wheel being at low speed should be checked in the step 35 in FIG. 3 and signals in synchronism with the leading and trailing edges of a wheel speed pulse can be used as trigger signals. Accordingly, it is possible to obtain sufficient wheel speed data even in low speed drive by measuring the wheel speed data every half a cycle which data has hitherto been measured every cycle.

As described above, the virtual vehicle speed is assumed to have a gradient of −1 g according to this control and the slip rate S required now is a function of the ON time $T_{ON}$ for which the immediately previous brake releasing signal lasts.

Figure 11:
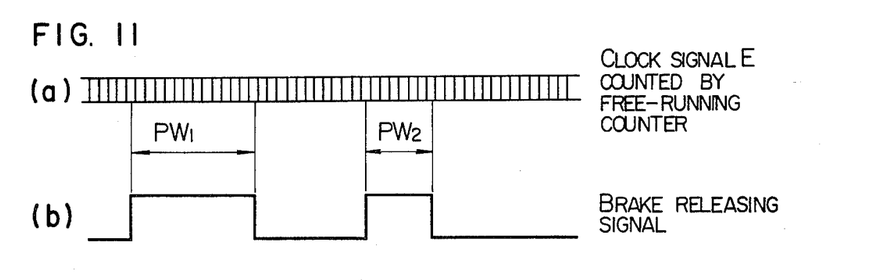

FIG. 11 illustrates a method of obtaining the ON time $T_{ON}$. This method is the same in principle as that shown in FIG. 9. In FIG. 11, signals generated in synchronism with the deliveries of the brake releasing signal and the brake release cancelling signal are used as the trigger signals and the count values of the free-running counter 125 in accordance with the trigger signals are stored in a P' register 155 and a Q' register 157 of the register 129 shown in FIG. 7. After the storing operation, a subtracting operation between both the registers 155 and 157 is performed and the result of the subtraction is stored in, for example, a S' register 159 of the register 129. The instant at which the next brake releasing signal is delivered, is determined on the basis of the stored value. If the time for which the brake releasing signal lasts is given by PW1 as shown in FIG. 11, the corresponding slip rate S can be obtained by using the relationship shown in FIG. 6. And when the obtained slip rate is reached, the brake releasing signal is again delivered. In like manner, if the time is PW2, the corresponding slip rate is similarly obtained and like operations are repeated thereafter.

In the embodiment above, the registers 127 and 129 are used to store the contents of the free-running counters, but, as a variation of the embodiment, the registers may be replaced by latches, the contents of the free-running counters being stored in that case in the internal memory (RAM) of the CPU, and moreover the subtraction between the stored values may be made in the internal memory. Further, the register control circuits 131 and 133 may be omitted and the functions thereof may be achieved by a portion of the CPU.

What is claimed is:

1. A skid control method utilizing a wheel speed sensor; a control circuit including therein a microcomputer for calculating the wheel speed in accordance with pulse signals from said wheel speed sensor and calculating a slip rate of the wheel in accordance with the calculated wheel speed, for delivering a brake releasing signal when the calculated slip rate reaches a predetermined ON slip rate, and for delivering a brake releasing cancelling signal when the calculated slip rate decreases to a predetermined OFF slip rate; and a brake oil pressure control apparatus for controlling the pressure of the oil supplied to a wheel braking means in response to the signal from said skid control circuit in such a manner that the brake is released when the brake releasing signal is delivered and the brake is applied to the wheel when the brake releasing cancelling signal is delivered, wherein said microcomputer is provided with free-running counter means for counting clock pulses and memory means for storing the contents of said free-running counter means; and said wheel speed is calculated by completing:

a first step of forming a first interrupt processing signal in accordance with said pulse signal from said wheel speed sensor;

a second step of storing in said memory means the contents of said free-running counter means in response to the delivery of the first interrupt processing signal through an interrupt processing;

a third step of storing in said memory means the contents of said free-running counter means in response to a second interrupt processing signal formed in accordance with the pulse signal which was delivered an integral number of cycles of said pulse signal after said delivery of said first interrupt processing signal; and a fourth step of obtaining the wheel speed through the subtraction of one value from another stored in said memory means; and wherein said first to fourth steps are executed in each half cycle of an alternating waveform of a wheel speed.

2. A skid control method as claimed in claim 1, wherein in the calculation of said wheel speed said interrupt processing signal is formed by using as a trigger signal the leading edge of said pulse signal from said wheel speed sensor.

3. A skid control method as claimed in claim 1, wherein a means for checking whether the actual wheel speed is lower than the predetermined value or not, is provided and said interrupt processing signal is formed by using as trigger signals the leading and the trailing edges of said pulse signal from said wheel speed sensor.

4. A skid control method utilizing a wheel speed sensor; a control circuit including therein a microcomputer for calculating the wheel speed in accordance with pulse signals from said wheel speed sensor and calculating a slip rate of the wheel in accordance with the calculated wheel speed, for delivering a brake releasing signal when the calculated slip rate reaches a predetermined ON slip rate, and for interrupting the brake releasing signal when the calculated slip rate decreases to a predetermined OFF slip rate, and a brake oil pressure control apparatus for controlling the pressure of the oil supplied to a wheel braking means in response to the signal from said control circuit in such a manner that the brake is released when the brake releasing signal is delivered and the brake is applied to the wheel when the brake releasing signal is interrupted, wherein
said microcomputer is provided with free-running counter means for counting clock pulses, and with memory means for storing the contents of said free-running counter means and for storing data representing the relationship between the slip rate and a brake releasing period; and
wherein the skid control is performed by repeating a series of:
a first step of storing in said memory means the contents of said free-running counter means in response to an interrupt processing signal formed in accordance with the pulse signal from said wheel speed sensor and of calculating the wheel speed through the subtraction of one value from another value sequentially stored in said memory means, said first step being executed in each half cycle of an alternating waveform of wheel speed;
a second step of calculating a virtual vehicle speed from the calculated wheel speed;
a third step of calculating an actual slip rate through the comparison between said virtual vehicle speed and said wheel speed, checking whether said actual slip rate has reached a predetermined ON slip rate stored in said memory means, and delivering a brake releasing signal when said actual slip rate reaches the predetermined ON slip rate;
a fourth step of interrupting said brake releasing signal when said actual slip rate does not satisfy the condition for delivering said brake releasing signal;
a fifth step of calculating the brake releasing period; and
a sixth step of calculating the predetermined ON slip rate to be used in the next cycle of the alternating waveform of the wheel speed on the basis of said brake releasing period obtained in said fifth step.

5. A skid control method as claimed in claim 4, wherein, in said fifth step, the contents of said free-running counter means are stored in said memory means in response to the interrupt processing signal formed in accordance with said brake releasing signal, and the actual brake releasing period is calculated from the difference between one value and another value of said free-running counter means sequentially stored in said memory means.

6. A skid control method utilizing a wheel speed sensor; a control circuit including therein a microcomputer for calculating the wheel speed in accordance with pulse signals from said wheel speed sensor and calculating a slip rate of the wheel in accordance with the calculated wheel speed, for delivering a brake releasing signal when the calculated slip rate reaches a predetermined ON slip rate, and for delivering a brake releasing cancelling signal when the calculated slip rate decreases to a predetermined OFF slip rate; and a brake oil pressure control apparatus for controlling the pressure of the oil supplied to a wheel braking means in response to the signal from said control circuit in such a manner that the brake is released when the brake releasing signal is delivered and the brake is applied to the wheel when the brake releasing cancelling signal is delivered, wherein
said microcomputer is provided with free-running counter means for counting clock pulses and with memory means for storing the contents of said free-running counter means and for storing data representing the relationship between the slip rate and a brake releasing period; and
wherein the skid control is performed by repeating a series of:
a first step of calculating the wheel speed in each half cycle of an alternating waveform of wheel speed;
a second step of calculating a virtual vehicle speed from the calculated wheel speed;
a third step of calculating an actual slip rate through the comparison between said virtual vehicle speed and said wheel speed, checking whether said actual slip rate has reached a predetermined ON slip rate stored in said memory means, and delivering a brake releasing signal when said actual slip rate reaches said predetermined ON slip rate;
a fourth step of interrupting said brake releasing signal when said actual slip rate does not satisfy the condition for delivering said brake releasing signal;
a fifth step of calculating the brake releasing period, the contents of said free-running counter means being stored in said memory means in response to an interrupt processing signal formed in accordance with said brake releasing signal, and the actual brake releasing period being calculated from the difference between one value and another value of said free-running counter means sequentially stored in said memory means; and
a sixth step of calculating the predetermined ON slip rate to be used in the next cycle of the alternating waveform of the wheel speed on the basis of said brake releasing period obtained in said fifth step.

7. A skid control method for controlling the braking of a vehicle during a braking operation to avoid a skid condition comprising the steps of generating pulse signals by a wheel speed sensor in accordance with an alternating waveform, calculating the wheel speed based upon the generated pulse signals utilizing a control circuit including a microcomputer having free-running counter means for counting clock pulses and memory means for storing the contents of the free-running counter means, determining that the wheels of the vehicle are slipping during a braking operation, generating a brake release signal when the wheels are slipping, and controlling the braking of the wheels in response to at least the brake release signal to avoid a skid condition, the step of calculating the wheel speed including forming process interrupt signals in response to pulse signals from the wheel speed sensor, storing a first value of the contents of the free-running counter means in the memory means in response to a process interrupt signal, subsequently storing a second value of the contents of the free-running counter means in the memory means in response to another process interrupt signal, and subtracting one of the first and second stored values from the other of the first and second stored values, the subtracted value being an indication of the wheel speed obtainable within one half cycle of the alternating waveform.

8. A skid control system for controlling the braking of a vehicle during a braking operation to avoid a skid condition, comprising wheel speed sensor means for generating pulse signals in accordance with an alternating waveform, control circuit means responsive to the wheel speed sensor means for determining that the wheels of the vehicle are slipping during a braking operation and for generating a brake release signal when the wheels are slipping, braking means for braking the wheels of the vehicle and being responsive to the brake release signal for releasing the braking of the wheels to avoid a skid condition, the control circuit means including microcomputer means having free-running counting means for counting clock pulses and memory means for storing the contents of the free-running counter means, the control circuit means forming process interrupt signals in response to pulse signals of the wheel speed sensor means, the microcomputer means including means for calculating the wheel speed based upon the generated pulse signals of the wheel speed sensor means, the memory means storing a first value of the contents of the free-running counter means in response to a first process interrupt signal and storing a second value of the contents of the free-running counter means in response to a second process interrupt signal, the calculating means subtracting one of the first and second stored values from the other of the first and second stored values to form a subtracted value which is an indication of the wheel speed obtainable within one half cycle of the alternating waveform.

9. A skid control system according to claim 8, wherein the memory means further stores data representing a relationship between slip rate and a brake releasing period, the microcomputer means including means for calculating a virtual vehicle speed from the calculated wheel speed, means for calculating an actual slip rate through comparison of the virtual vehicle speed and the wheel speed, means for comparing the actual slip rate with a predetermined ON slip rate stored in the memory means and for generating the brake releasing signal when the actual slip rate reaches the predetermined ON slip rate, means for interrupting the brake releasing signal when the actual slip rate decreases to a predetermined OFF slip rate, means for calculating the brake releasing period, and means for calculating the predetermined ON slip rate to be used in the next cycle of the alternating waveform of the wheel speed on the basis of the prior brake releasing period.

10. A skid control system according to claim 9, wherein the means for calculating the brake releasing period include means for enabling sequential storage of the contents of the free-running counter means in the memory means at the beginning and end of the brake releasing signal and for subtracting one value from another value sequentially stored in the memory means as the brake releasing period.

11. A skid control system for controlling the braking of a vehicle during a braking operation to avoid a skid condition, comprising wheel speed sensor means for generating pulse signals in accordance with an alternating waveform, and a control circuit means responsive to the wheel speed sensor means for determining that the wheels of the vehicle are slipping during a braking operation and for generating a brake release signal when the wheels are slipping, braking means for braking wheels of the vehicle and being responsive to the brake release signal for releasing the braking of the wheels to avoid a skid condition, the control circuit means including microcomputer means having free-running counting means for counting clock pulses and memory means for storing the contents of the free-running counter means and for storing data representing a relationship between slip rate and a brake releasing period, the microcomputer means including means for calculating the wheel speed in each half cycle of the alternating waveform of wheel speed, means for calculating a virtual vehicle speed from the calculated wheel speed, means for calculating an actual slip rate through a comparison of the virtual vehicle speed and the wheel speed, means for comparing the actual slip rate with a predetermined ON slip rate stored in the memory means and for generating the brake releasing signal when the actual slip rate reaches the predetermined ON slip rate, means for interrupting the brake releasing signal when the actual slip rate decreases to a predetermined OFF slip rate, means for calculating the brake releasing period including means for enabling sequential storage of the contents of the free-running counter means in the memory means at the begin and end of the brake releasing signal and for subtracting one value from another sequentially stored in the memory means as the brake releasing period, and means for calculating the predetermined ON slip rate to be used in the next cycle of the alternating waveform of the wheel speed on the basis of the prior brake releasing period.

* * * * *